US012155149B2

(12) United States Patent
Sano et al.

(10) Patent No.: US 12,155,149 B2
(45) Date of Patent: Nov. 26, 2024

(54) TERMINAL ASSEMBLY STRUCTURE WITH A HOLDER INCLUDING A DETECTION RIB

(71) Applicant: Yazaki Corporation, Tokyo (JP)

(72) Inventors: Takuya Sano, Shizuoka (JP); Tomoki Matsukawa, Shizuoka (JP); Koudai Yamamoto, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 365 days.

(21) Appl. No.: 17/836,379

(22) Filed: Jun. 9, 2022

(65) Prior Publication Data

US 2022/0399671 A1 Dec. 15, 2022

(30) Foreign Application Priority Data

Jun. 11, 2021 (JP) ................................ 2021-097846

(51) Int. Cl.
*H01R 13/506* (2006.01)
*H01R 11/12* (2006.01)
*H01R 13/52* (2006.01)

(52) U.S. Cl.
CPC .......... *H01R 13/506* (2013.01); *H01R 11/12* (2013.01); *H01R 13/5202* (2013.01)

(58) Field of Classification Search
CPC ...................................................... H01R 11/12
See application file for complete search history.

(56) References Cited

U.S. PATENT DOCUMENTS

| | | | | |
|---|---|---|---|---|
| 9,912,091 B1* | 3/2018 | Miyazawa | H01R 13/422 | |
| 2010/0105223 A1* | 4/2010 | Taguchi | H01R 4/34 | 439/76.2 |
| 2016/0006142 A1* | 1/2016 | Okuhira | H01R 4/18 | 439/805 |
| 2016/0294075 A1 | 10/2016 | Shiraki | | |
| 2016/0301149 A1* | 10/2016 | König | H01R 11/12 | |
| 2021/0273353 A1 | 9/2021 | Ukyo | | |

FOREIGN PATENT DOCUMENTS

| | | |
|---|---|---|
| JP | 2-115269 U | 9/1990 |
| JP | 10-223272 A | 8/1998 |
| JP | 2003-317821 A | 11/2003 |
| JP | 2008-135404 A | 6/2008 |
| JP | 2011-81990 A | 4/2011 |
| JP | 2016-174504 A | 9/2016 |
| WO | 2020/013338 A1 | 1/2020 |

* cited by examiner

*Primary Examiner* — Oscar C Jimenez
(74) *Attorney, Agent, or Firm* — Sughrue Mion, PLLC

(57) ABSTRACT

A terminal assembly structure according to an embodiment of the present invention includes: a crimp terminal having a crimp portion configured to crimp and connect a core wire of an electric wire and a fastening portion configured to be fastened by a fastening member; and a holder having a base portion configured to place the crimp terminal when fastening the crimp terminal to the holder. The holder has a detection rib at a position on the base portion to be oppose to the crimp portion of the crimp terminal, the detection rib being configured to interfere with the crimp portion when misassembly of front and back sides of the crimp terminal to the holder occurs.

7 Claims, 10 Drawing Sheets

TERMINAL ASSEMBLY STRUCTURE WITH A HOLDER INCLUDING A DETECTION RIB

CROSS REFERENCE TO RELATED APPLICATION

The present application is based on, and claims priority from the prior Japanese Patent Application No. 2021-097846, filed on Jun. 11, 2021, the entire contents of which are incorporated herein by reference.

TECHNICAL FIELD

The present disclosure relates to a terminal assembly structure in which a terminal is fastened to a holder by a fastening member such as a bolt.

BACKGROUND

JPH 10-223272 A describes a terminal assembly structure of a related art. In the terminal assembly structure described in JPH 10-223272 A, a crimp terminal with a hole connected to one wire and another crimp terminal with a hole connected to another wire are fastened in an overlapping manner by putting through the terminals to a bolt erected on a box body and by fastening the terminals with a nut.

SUMMARY

In the conventional terminal assembly structure, each of the terminals may be assembled in reversed orientation. Therefore, in the conventional terminal assembly structure, there is a concern of a misassembly of terminals, and an improvement of assembly workability is desired.

An object of the present disclosure is to provide a terminal assembly structure that can easily and surely detect misassembly of a terminal and improve an assembly workability of the terminal.

A terminal assembly structure according to one or more embodiments includes: a crimp terminal having a crimp portion configured to crimp and connect a core wire of an electric wire and a fastening portion configured to be fastened by a fastening member; and a holder having a base portion configured to place the crimp terminal when fastening the crimp terminal to the holder. The holder has a detection rib at a position on the base portion to be oppose to the crimp portion of the crimp terminal, the detection rib being configured to interfere with the crimp portion when misassembly of front and back sides of the crimp terminal to the holder occurs.

The base portion may have a terminal placing base configured to place the fastening portion of the crimp terminal on an upper stage of the base portion. On a front side of the terminal placing base, a pair of the detection ribs may be arranged at a narrower interval than an overall width of the crimp portion.

The base portion may have an inclined rib arranged between the pair of the detection ribs. The inclined rib may be configured to guide the fastening portion of the crimp terminal to the terminal placing base.

The fastening portion of the crimp terminal may be formed into a substantially rectangular plate shape with a tip shaped in an arcuate shape and may have an oval hole for fastening formed in a center of the fastening portion and may be configured to insert a bolt as the fastening member through the oval hole for fastening.

According to the above configuration, the terminal assembly structure can easily and surely detect the misassembly of the terminal, and can improve the assembly workability of the terminals.

DETAILED DESCRIPTION

Various embodiments will be described hereinafter with reference to the accompanying drawings.

Hereinafter, a terminal assembly structure according to an embodiment of the present invention will be described in detail with reference to the drawings.

Figure 1:
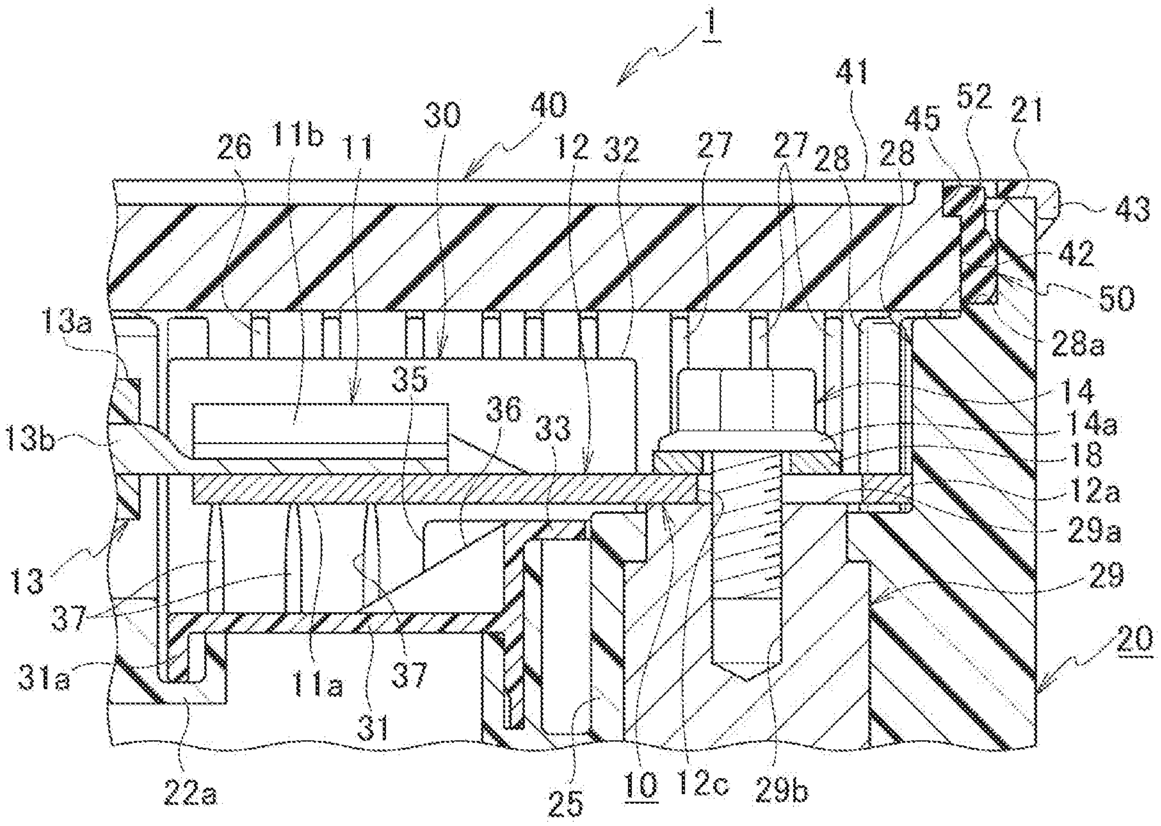
FIG. 1 is a cross-sectional view illustrating a part of an example of an assembled state of a terminal assembly structure according to one or more embodiments.
Figure 2:
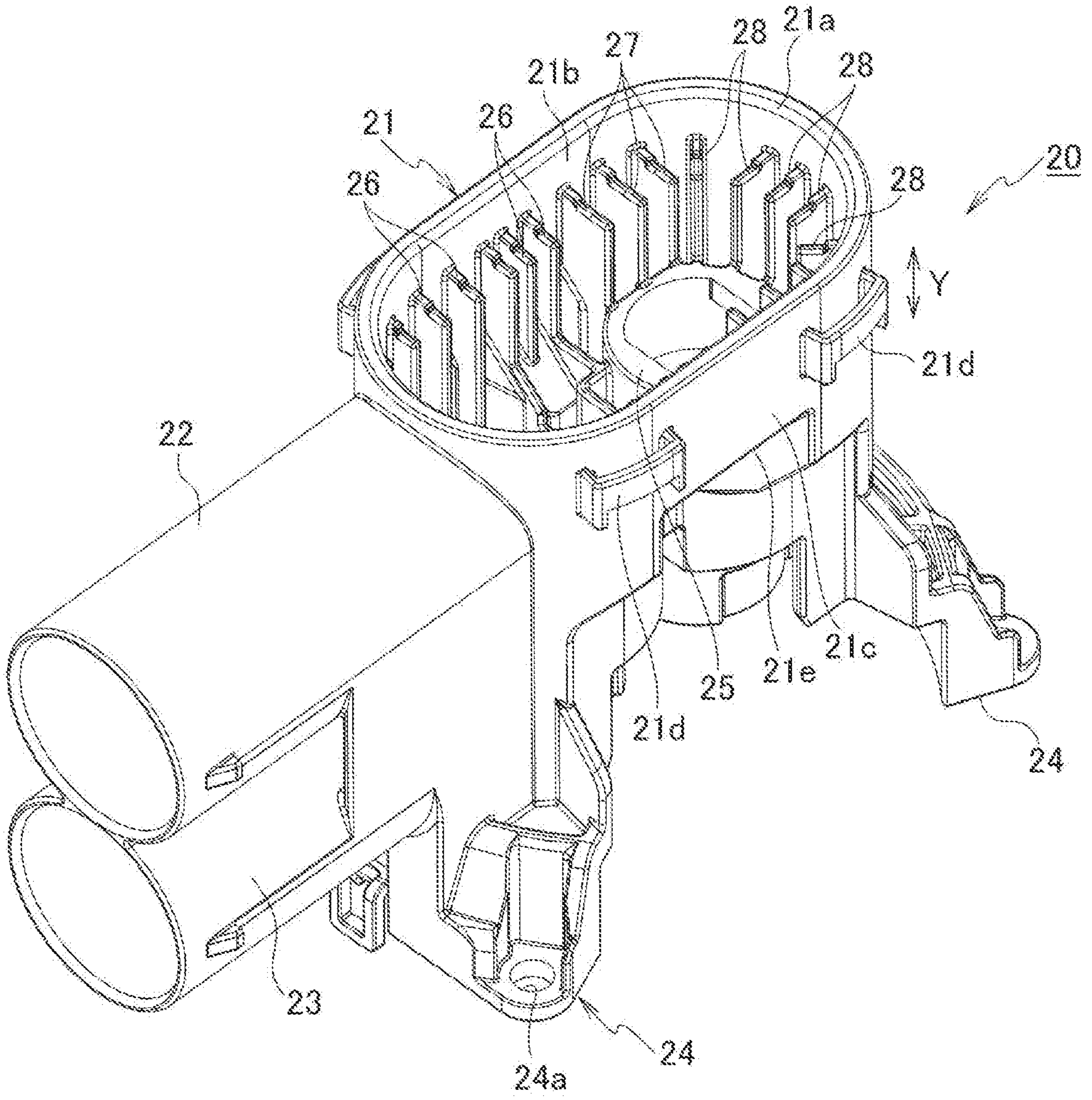
FIG. 2 is a perspective view of a holder configured to assemble terminals according to the above-described terminal assembly structure.
Figure 3:
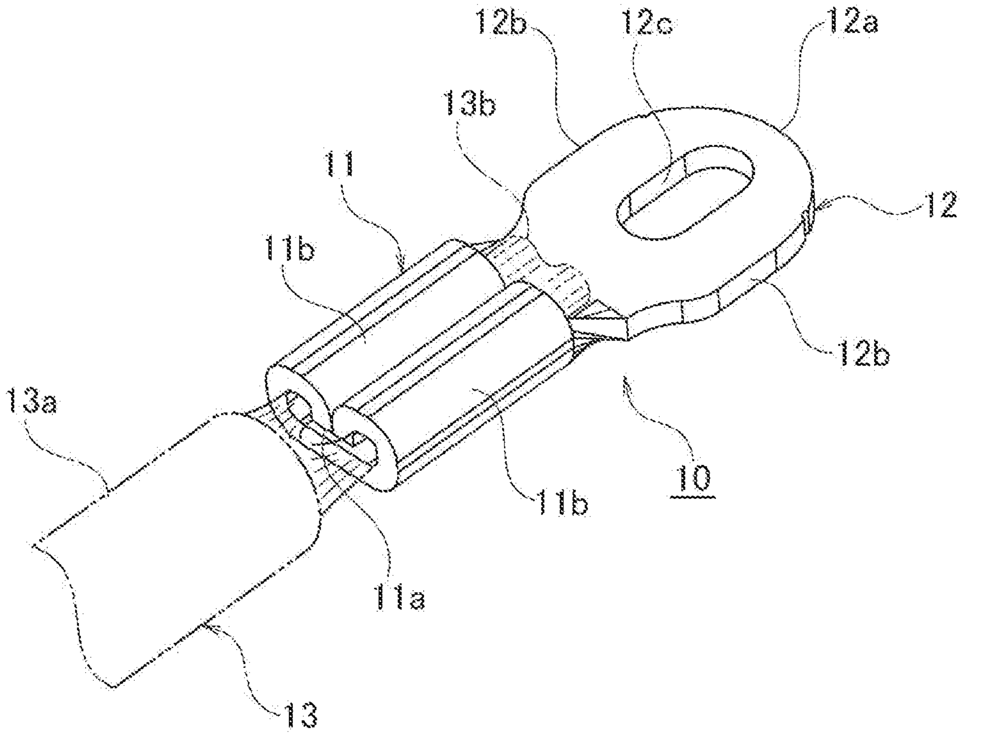
FIG. 3 is a perspective view of a crimp terminal.
Figure 4:
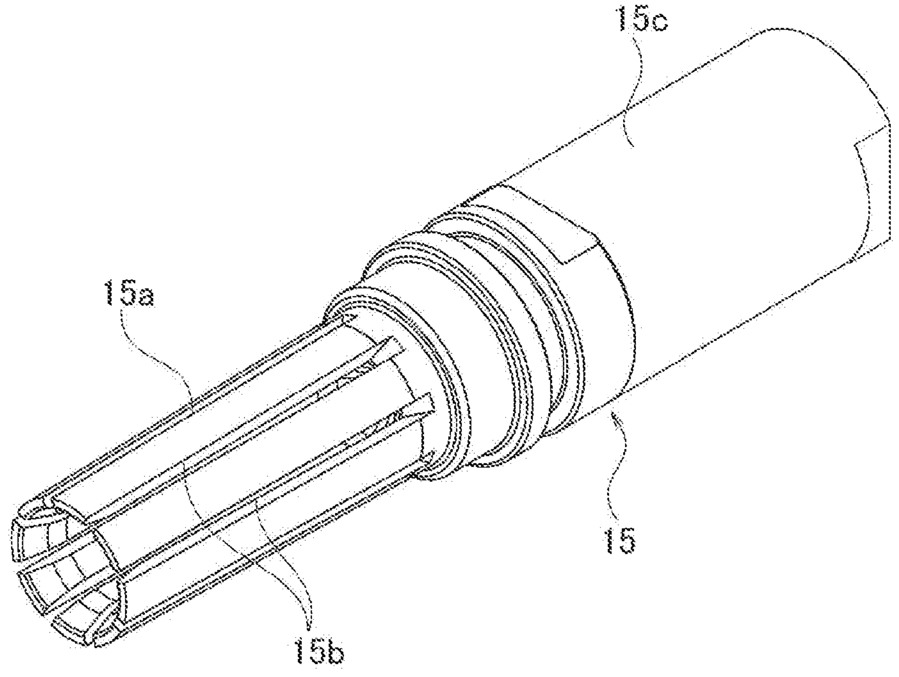
FIG. 4 is a perspective view of another terminal.
Figure 5:
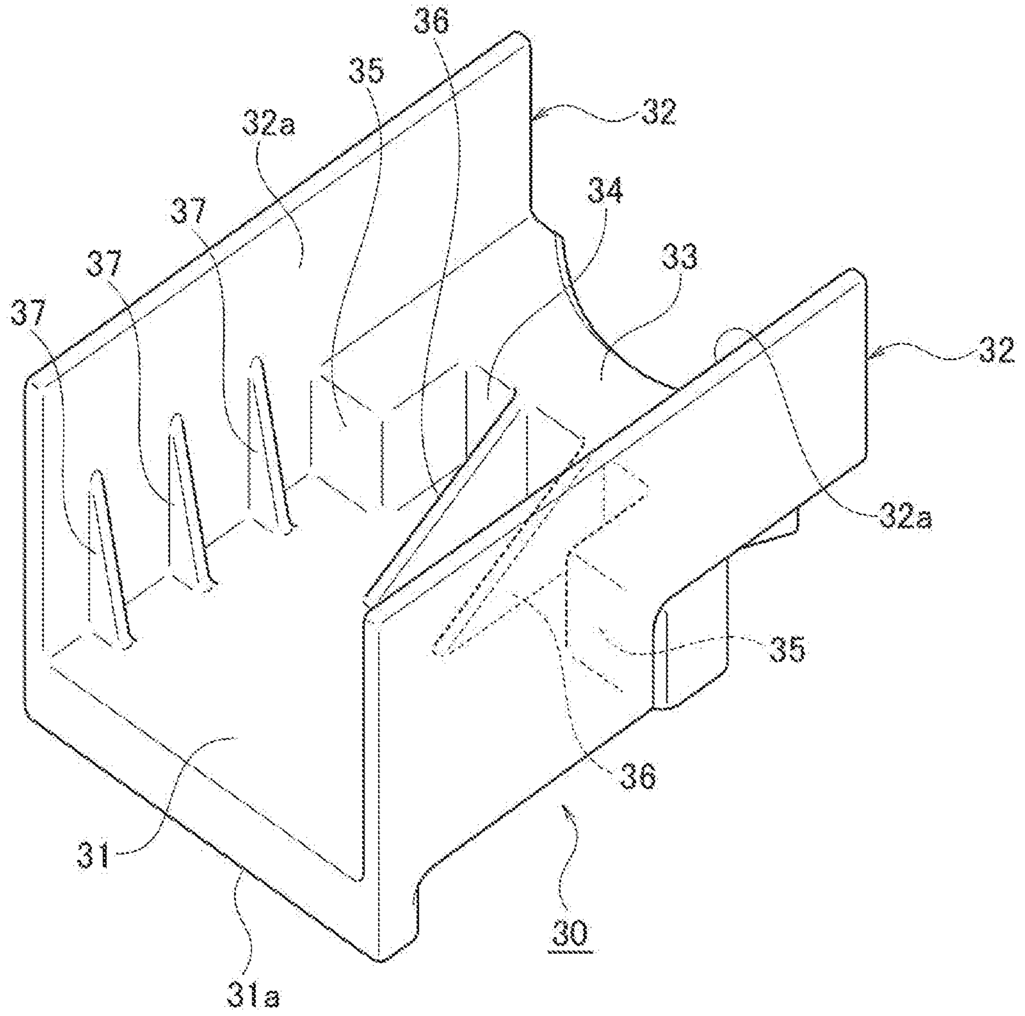
FIG. 5 is a perspective view of a base portion onto which the crimp terminal is placed.
Figure 6:
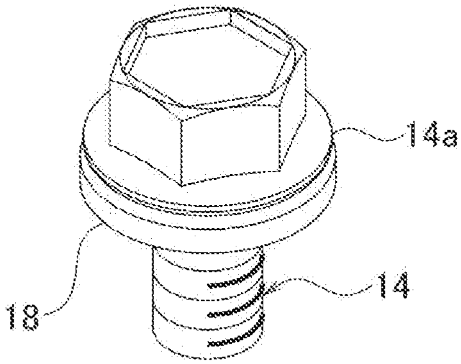
FIG. 6 is a perspective view of a bolt configured to fasten the crimp terminal to the holder.
Figure 7:
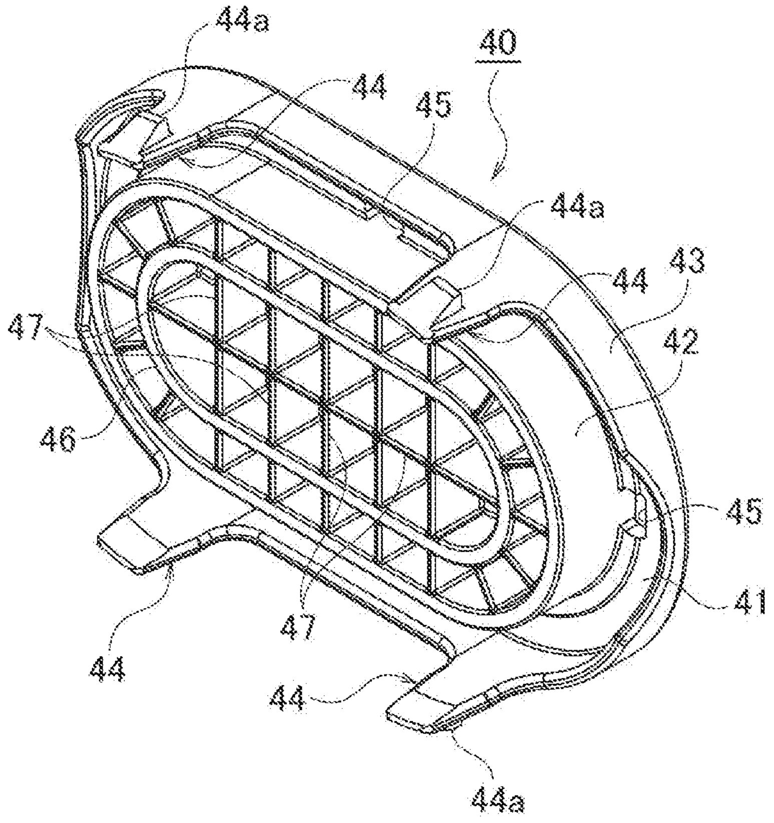
FIG. 7 is a perspective view of a cover configured to cover an opening of the holder.
Figure 8:
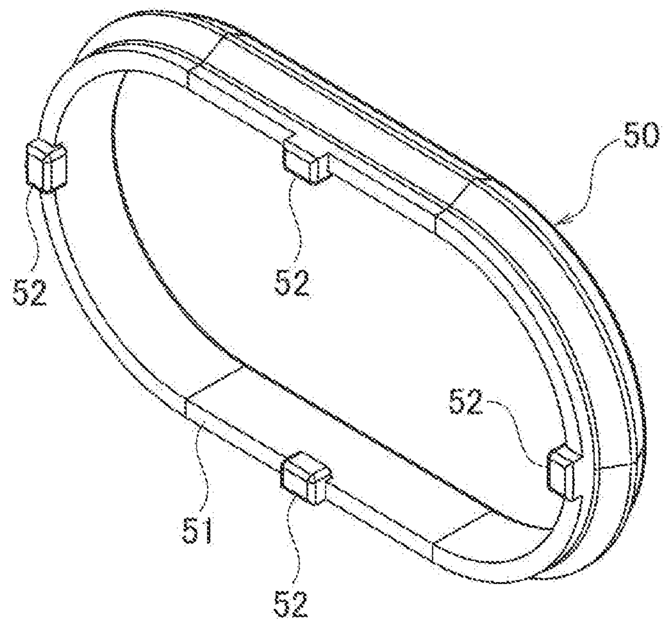
FIG. 8 is a perspective view of a packing that seals between the opening of the holder and the cover.
Figure 9:
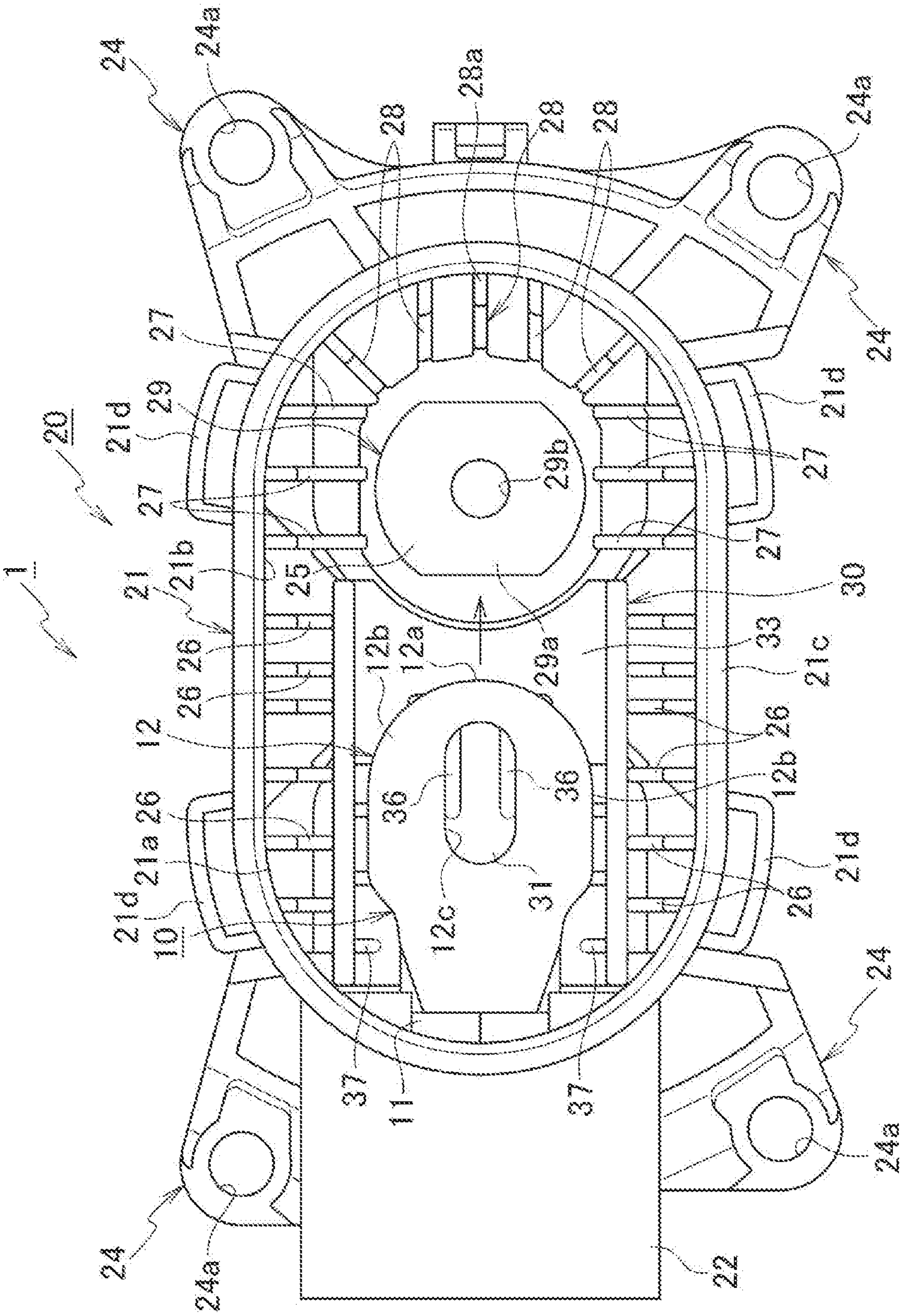
FIG. 9 is a plan view illustrating a state of the crimp terminal being assembled to the holder.
Figure 10:
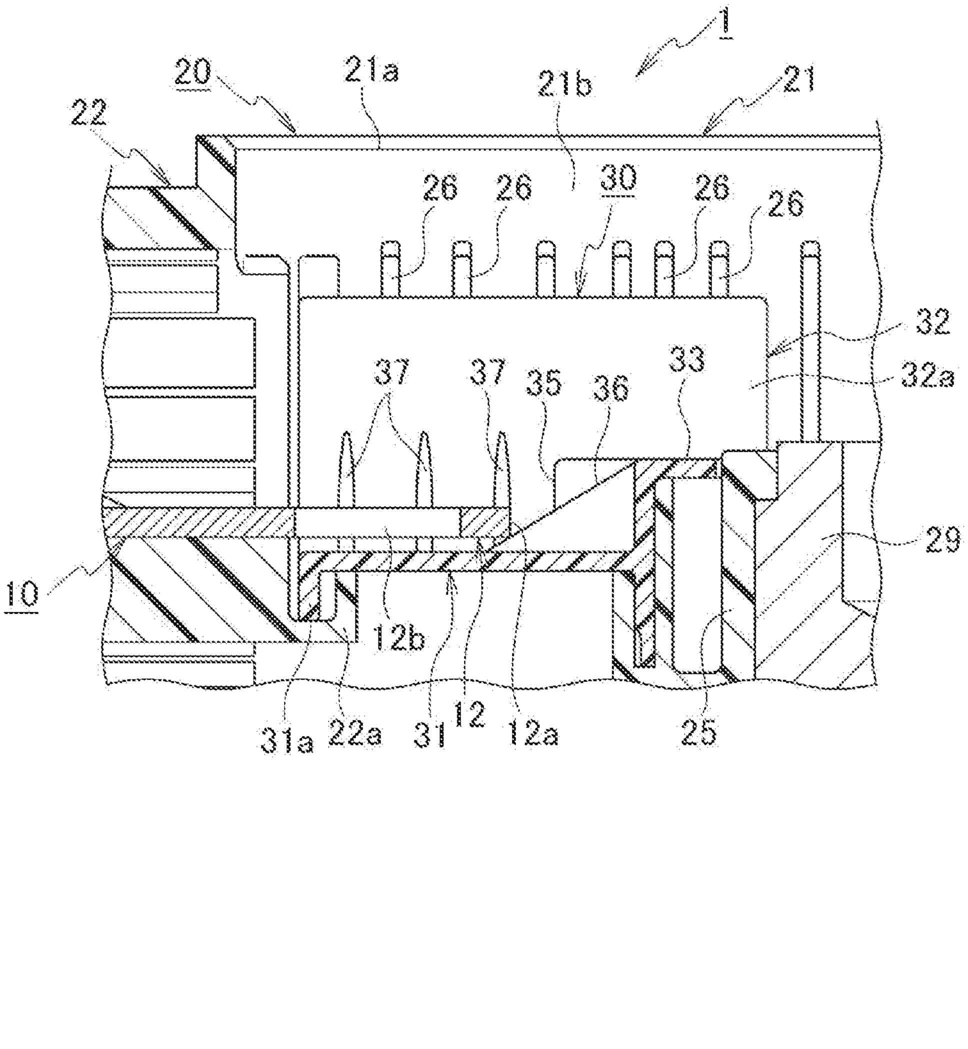
FIG. 10 is a cross-sectional view of a part of the terminal assembly structure illustrating a state in which the crimp terminal is being assembled to the holder.
Figure 11:
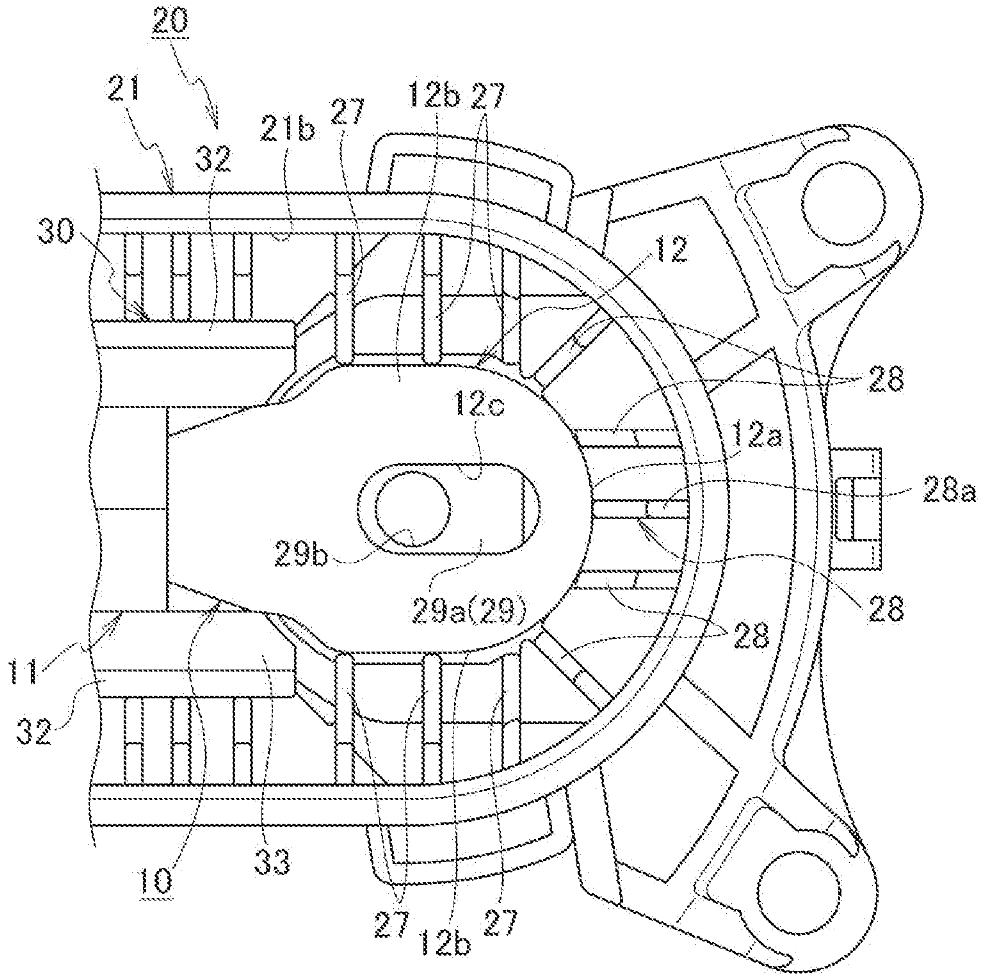
FIG. 11 is a plan view of a part of the terminal assembly structure illustrating a state in which the crimp terminal is assembled to the holder and is before being fastened with the bolt.
Figure 12:
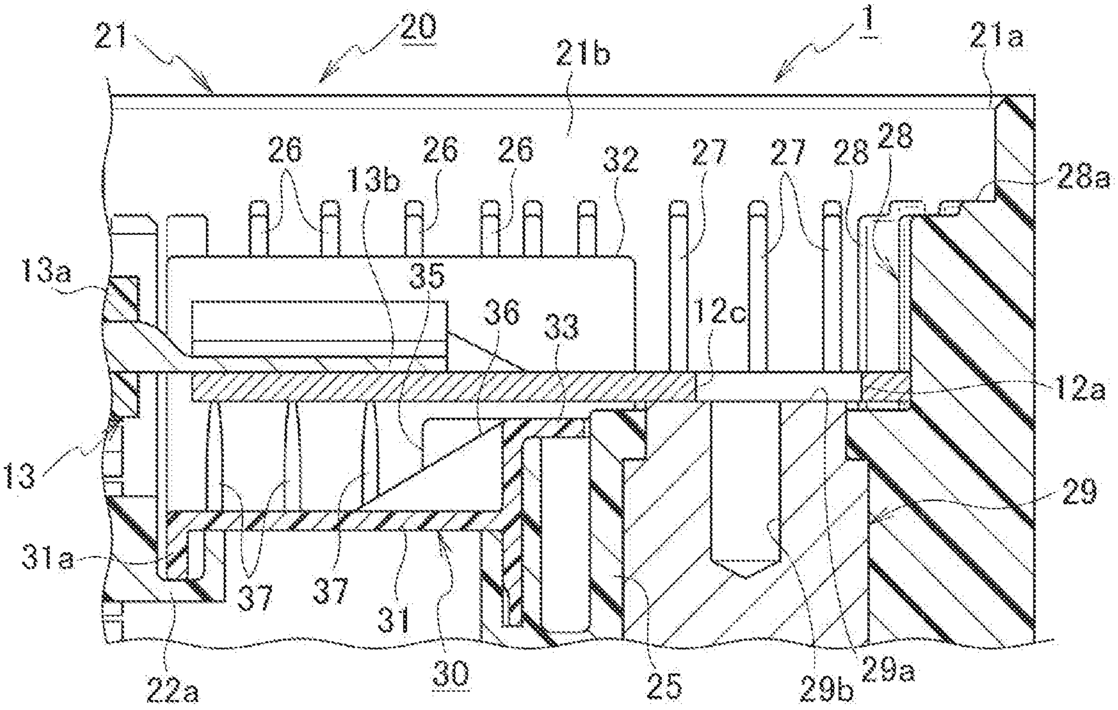
FIG. 12 is a cross-sectional view of a part of the terminal assembly structure illustrating a state in which the crimp terminal is assembled to the holder and is before being fastened with the bolt.
Figure 13:
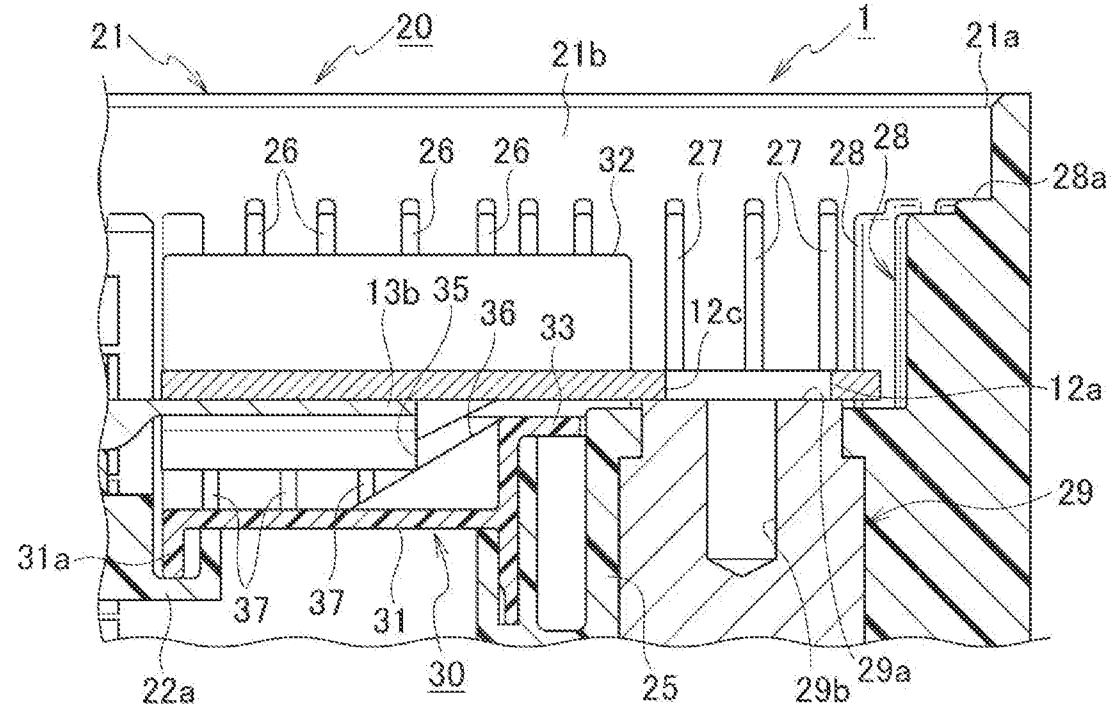
FIG. 13 is a cross-sectional view of a part of the terminal assembly structure illustrating a state in which the crimp terminal is misassembled to the holder.
Figure 14:
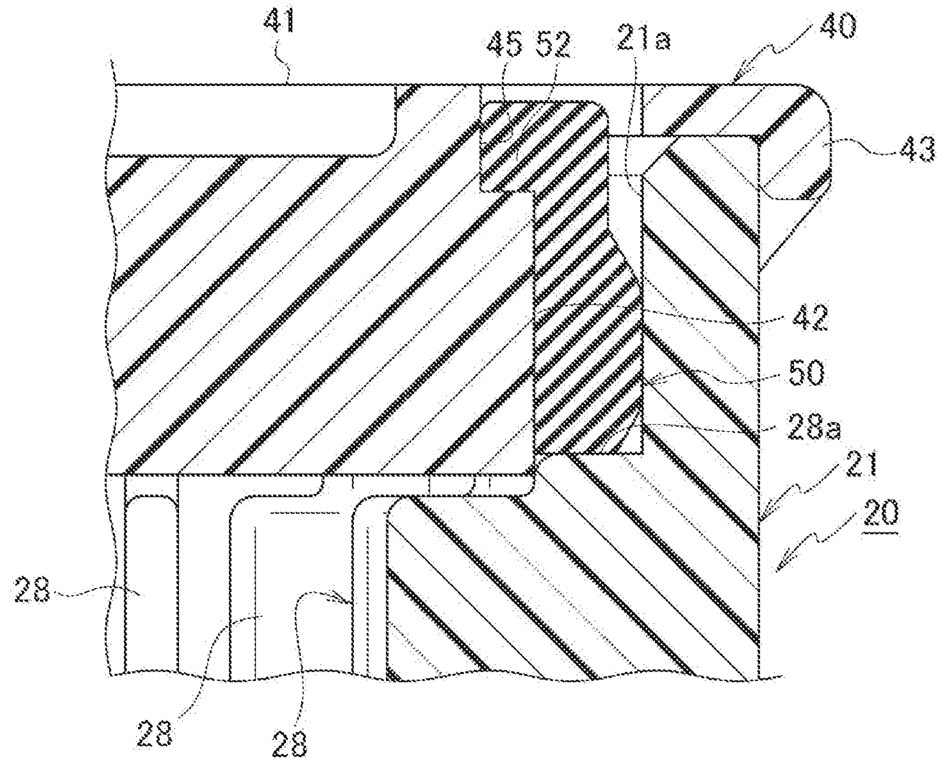
FIG. 14 is a cross-sectional view of a part of the terminal assembly structure illustrating a state in which the cover is attached to the opening of the holder.
Figure 15:
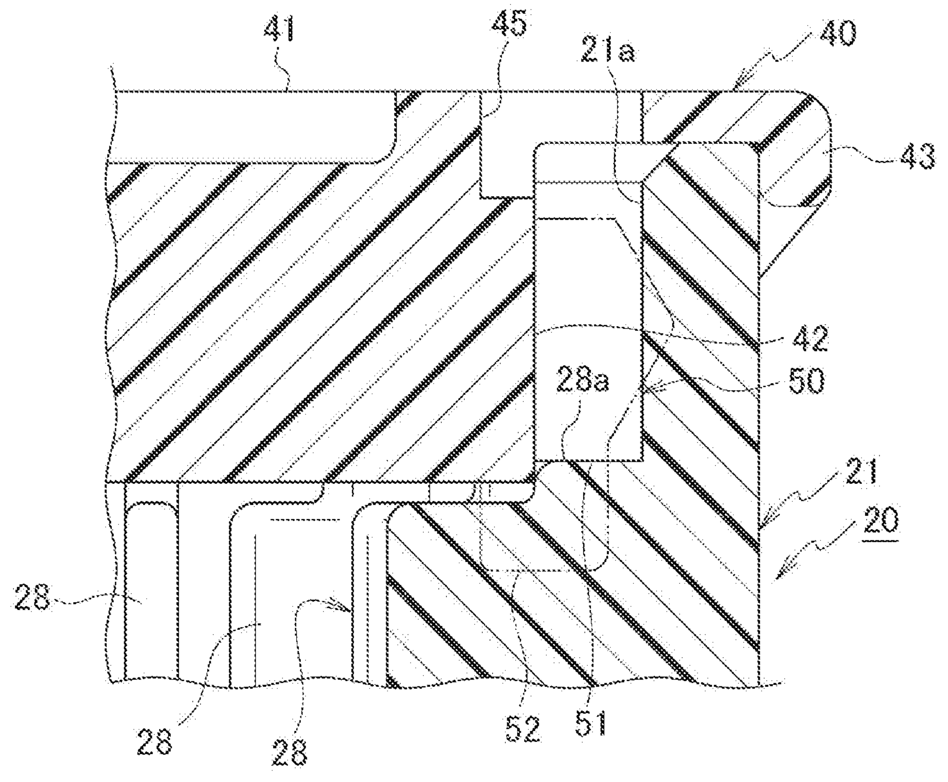
FIG. 15 is a cross-sectional view of a part of the terminal assembly structure illustrating a state in which the cover, to which the packing is misassembled, is attached to the opening of the holder.

FIG. 1 is a cross-sectional view illustrating a part of an example of an assembled state of a terminal assembly structure according to one or more embodiments. FIG. 2 is a perspective view of a holder configured to assemble terminals according to the above-described terminal assembly structure. FIG. 3 is a perspective view of a crimp terminal. FIG. 4 is a perspective view of another terminal. FIG. 5 is a perspective view of a base portion onto which the crimp terminal is placed. FIG. 6 is a perspective view of a bolt configured to fasten the crimp terminal to the holder. FIG. 7 is a perspective view of a cover configured to cover an opening of the holder. FIG. 8 is a perspective view of a packing that seals between the opening of the holder and the cover. FIG. 9 is a plan view illustrating a state of the terminal being assembled to the holder. FIG. 10 is a cross-sectional view of a part of the terminal assembly structure illustrating a state in which the crimp terminal is being assembled to the holder. FIG. 11 is a plan view of a part of the terminal assembly structure illustrating a state in which the crimp terminal is assembled to the holder and is being fastened with the bolt. FIG. 12 is a cross-sectional view of a part of the terminal assembly structure illustrating a state in which the crimp terminal is assembled to the holder and is before being fastened with the bolt. FIG. 13 is a cross-sectional view of a part of the terminal assembly structure illustrating a state in which the crimp terminal is misassembled to the holder. FIG. 14 is a cross-sectional view of a part of the terminal assembly structure illustrating a state in which the cover is attached to the opening of the holder. FIG. 15 is a cross-sectional view of a part of the terminal assembly structure illustrating a state in which the cover, to which the packing is misassembled, is attached to the opening of the holder.

As illustrated in FIGS. 1 to 8, a terminal assembly structure 1 includes a crimp terminal 10 having a substantially rectangular plate shaped part with a hole formed therein, a DC (direct current) terminal 15 with cylindrical shape, a holder 20 made of resin, an insulator (base portion) made of resin 30, a cover 40 made of resin, and a packing 50 made of rubber.

As illustrated in FIGS. 1 and 3, the crimp terminal 10 is formed by pressing a conductive metal plate. The crimp terminal 10 has a crimp portion 11 and a fastening portion 12. A core wire (conductor) 13*b* exposed from an end of an insulation coating 13*a* of an electric wire 13 is crimped and connected to the crimp portion 11. The fastening part 12 is used to be fastened by a bolt (fastening member) 14.

As illustrated in FIGS. 1 and 3, the crimp portion 11 of the crimp terminal 10 has a pair of crimping pieces 11*b* on both sides of the bottom part 11*a*. The core wire 13*b* exposed from the end of the insulation coating 13*a* of the electric wire 13 is crimped and connected with the pair of crimping pieces 11*b*. The fastening portion 12 of the crimp terminal 10 is formed into a substantially rectangular plate shape with an arcuate tip 12*a* and side parts 12*b* of the fastening portion 12 extends in parallel to each other. An oval hole 12*b* for fastening with an oval shape is formed in a center of the fastening portion 12. The oval hole 12*b* for fastening is configured to insert the bolt 14 through the oval hole 12*b*. The crimp terminal 10 is assembled into a peripheral wall 21 of the holder 20 from a cylindrical portion 22 at upper side of the holder 20, which will be described later. The electric wire 13 crimped and connected to the crimp portion 11 of the crimp terminal 10 is an electric wire for high voltage through which a high-voltage current may flow. Here, the "oval" described in the present application is a rounded rectangle obtained by replacing opposing short sides of the rectangle with semicircles (obround shape) or by replacing four corners of the rectangle with arcuate curves (rounded rectangle shape), and may further be an ellipse shape.

As illustrated in FIG. 4, the DC terminal 15 includes a wire connection portion 15*a* with a cylindrical shape and a partner-side connection portion 15*c* with a cylindrical shape formed as one member with the wire connection portion 15*a*. The wire connection portion 15*a* is disposed on one side of the DC terminal 15 in a longitudinal direction of the DC terminal. The wire connection portion 15*a* has a plurality of long slits 15*b* extending in the longitudinal direction of the DC terminal 15. An electric wire (not illustrated) is connected to the wire connection portion 15*a*. The partner-side connection portion 15*c* is disposed on the other side in the longitudinal direction of the DC terminal 15. A partner-side terminal (not illustrated) is connected to the partner-side connection portion 15*c*. The DC terminal 15 is assembled into the peripheral wall 21 of the holder 20 from the cylindrical portion 23 on the lower side of the holder 20, which will be described later.

As illustrated in FIG. 2, the holder 20 integrally includes the peripheral wall 21 with a cylindrical oval shape, a pair of cylindrical portions 22, 23 perpendicularly projecting from the peripheral wall 21, and mounting flanges 24 projecting at the four corners at a lower end of the peripheral wall 21. An opening 21*a* is provided at an upper end of the peripheral wall 21. On each side of a longitudinal direction on an outer peripheral surface 21*c* of the peripheral wall 21, a pair of locked portions 21*d* are provided. Each locked portion 21*d* projects from the outer peripheral surface 21*c* and has a frame-like shape. The pair of cylindrical portions 22, 23 are disposed on one side in the longitudinal direction of the peripheral wall 21 with the cylindrical oval shape, and projects from the peripheral wall 21 so as to overlap with each other when viewed from a vertical direction (the direction of the Y-arrow in FIG. 2). As illustrated in FIGS. 9 and 10, the proximal end of the cylindrical portion 22 on the upper side is located at inner side of the peripheral wall 21. In a lower part of the proximal end of the cylindrical portion 22 as illustrated in FIGS. 1, 10, etc., a recess 22*a* having a recessed upper surface is formed. Mounting holes 24*a* configured to insert bolts, which are used for mounting the holder 20 to a vehicle body panel or the like (not illustrated), are formed in the respective mounting flanges 24. The upper and lower ends of the peripheral wall 21 are ends when the direction of the Y arrow in FIG. 2 is the vertical direction. The "four corners" of the peripheral wall 21 with the cylindrical oval shape described in the present application may be the four corners of the rectangle, which is replaced by the semicircles or the arcuate curves to form the oval shape.

In the holder 20 illustrated in FIGS. 2, 9, and 12, a cylindrical oval section 25 extending in the vertical direction Y is integrally formed on an inner side of the peripheral wall 21 at a center in a width direction and on the other side in the longitudinal direction of the peripheral wall 21. An oval columnar base 29 to which the fastening portion 12 of the crimp terminal 10 is fastened and fixed with the bolt 14 via a flat washer 18 is fitted and fixed in the cylindrical oval section 25. The base 29 may be made of a metal or a hard resin.

As illustrated in FIGS. 2 and 9 to 12, on an inner peripheral surface 21*b* of the peripheral wall 21 with the cylindrical oval shape, a plurality of positioning ribs 26 extending in the vertical direction Y are integrally formed from the cylindrical portion 22 side to the cylindrical oval section 25 side. The plurality of the positioning ribs 26 are formed at a predetermined interval and arranged to oppose each other. The plurality of the positioning ribs 26 position and fix the insulator 30. The plurality of the positioning ribs 26 are integrally formed to project from the inner peripheral surface 21*b* of the peripheral wall 21 with the cylindrical oval shape, and function as reinforcing ribs. In the present embodiment, a fastening direction of the bolt (fastening member) 14 is the vertical direction Y. A cutout 21*e* with a rectangular shape is formed in the lower center of the front side of the peripheral wall 21. An electric wire such as a mating terminal connected to the DC terminal 15 is routed from the cutout 21*e*.

A plurality of ribs 27, 28 extending in the vertical direction Y are integrally formed on the inner peripheral surface 21*b* of the peripheral wall 21 with the cylindrical oval shape around the cylindrical oval section 25. The plurality of ribs 27, 28 are formed so as to be arranged around the fastening portion 12 of the crimp terminal 10 fastened to the base 29. The plurality of ribs 27, 28 position the fastening portion 12 on a terminal placing base 33 of the insulator 30. The plurality of ribs 27, 28 are integrally formed to project from the inner peripheral surface 21*b* of the peripheral wall 21 with the cylindrical oval shape and function as reinforcing ribs. The plurality of ribs 27, 28 include a plurality of guide ribs 27 configured to abut on and to guide both sides 12*b* of the fastening portion 12 of the crimp terminal 10, and a plurality of abutment ribs 28 configured to abut on the tip 12*a* with arcuate shape of the fastening portion 12 of the crimp terminal 10. More specifically, as illustrated in FIGS. 2, 9, and 12, the guide ribs 27 are integrally formed to project from the opposing inner peripheral surfaces 21*b* of the peripheral wall 21 with cylindrical oval shape at equal intervals of 3 pieces each. The abutment ribs 28 are integrally formed to project at equal intervals of three at a center of the inner peripheral surface 21*b* on the other side in the longitudinal direction of the peripheral wall 21, where the peripheral wall is formed in the arcuate shape. Further, the abutment ribs 28 are formed integrally and radially on the inner peripheral surface 21*b* on both sides of the three abutment ribs 28, one abutment rib 28 on each side.

As illustrated in FIGS. 5 and 10, the insulator (base portion) 30 has a bottom wall 31 and a pair of side walls 32 erected from both sides of the bottom wall 31. The insulator 30 is configured to guide the fastening portion 12 of the crimp terminal 10 when the crimp terminal 10 is assembled and fastened to the holder 20. A terminal placing base 33 is integrally formed on the bottom wall 31 via a standing wall 34. The terminal placing base 33 forms an upper stage of the insulator 30 at a rear part of the insulator 30. A fastening portion 12 of the crimp terminal 10 is mounted on the terminal placing base 33 when the crimp terminal 10 is assembled in the holder 20. Note that the insulator 30 is assembled inside the holder 20 from the opening 21*a* of the peripheral wall 21. At this time, as illustrated in FIG. 10, the insulator 30 is positioned between the plurality of positioning ribs 26. The insulator 30 is fixed by fitting a bent front part 31*a* of the bottom wall 31 into the recess 22*a* formed in the lower part of the proximal end of the cylindrical portion 22 on the upper side.

As illustrated in FIGS. 5 and 9 to 12, when the crimp terminal 10 is assembled in the holder 20, the pair of side walls 32 of the insulator 30 are positioned at positions opposed to the pair of crimping pieces 11*b* of the crimp portion 11 of the crimp terminal 10. A pair of detection ribs 35 are provided at the positions on the pair of side walls 32 to be opposed to the pair of crimping pieces 11*b* of the crimp terminal 10 in the state the crimp terminal 10 is assembled in the holder 20. The pair of detection ribs 35 is configured to interfere with the crimp portion 11 when misassembly of front and back sides of the crimp terminals 10 occurs. The pair of detection ribs 35 protrude from the standing wall 34 positioned on the front side of the terminal placing base 33. The pair of detection ribs 35 are arranged at an interval narrower than the overall width of the pair of crimping pieces 11*b* of the crimp portion 11. A pair of inclined ribs 36 configured to guide the fastening portion 12 of the crimp terminal 10 to the terminal placing base 33 are provided projectingly between the pair of detection ribs 35 provided on the standing wall 34. Further, as illustrated in FIG. 13, when the crimp terminal 10 is misassembled, the pair of crimping pieces 11*b* of the crimp portion 11 are positioned on the lower side, and the ends of the pair of crimping pieces 11*b* on the side of the fastening portion 12 come into contact with the pair of detection ribs 35. Thus, misassembly of the crimp terminal 10 is detected. A plurality of inclined parts 37 is formed to project from the pair of side walls 32 at a position from the front side of each inner surface 32*a* of the pair of side walls 32 to the standing wall 34. The plurality of inclined parts 37 support both side parts 12*b* of the fastening portion 12 of the crimp terminal 10 so as to sandwich them when the crimp terminal 10 is assembled in the holder 20.

As illustrated in FIGS. 1, 7, and 14, the cover 40 covers the opening 21*a* of the peripheral wall 21 with cylindrical oval shape of the holder 20. The cover 40 has a ceiling wall part 41 with oval plate shape, an inner peripheral wall part 42 with cylindrical oval shape, and an outer peripheral wall part 43 with cylindrical oval shape. The inner peripheral wall part 42 and the outer peripheral wall part 43 are arranged to sandwich the peripheral wall 21 while covering the opening 21*a* of the peripheral wall 21 with the cover 40. On both longitudinal sides of the outer peripheral wall part 43, a pair of lock pieces 44 are protruded so as to oppose each other. Each lock piece 44 has a lock projection 44*a*. The locking projections 44*a* of the pair of lock pieces 44 of the cover 40 are locked to the locked portions 21*d* of the peripheral wall 21. Thus, the cover 40 is assembled and attached to the holder 20 so as to cover the opening 21*a* of the peripheral wall 21. The ceiling wall part 41 of the cover 40 has locking holes 45 configured to fix the packing 50 at each center positions of the inner peripheral wall portion 42 in the front, back, left and right directions when the packing is assembled to the cover 40. The cover 40 is reinforced by an oval annular wall 46 provided inside the inner peripheral wall portion 42 and a cross-shaped partition wall 47.

As illustrated in FIGS. 1, 8, and 14, the packing 50 is formed in an oval annular shape. The packing 50 is fitted between the inner peripheral wall portion 42 and outer peripheral wall portion 43 of the cover 40 to seal between the cover 40 and the opening 21*a* of the holder 20. Each of the front, rear, left, and right center positions of the ceiling surface 51 of the packing 50 has a lock projection 52, which enters the locking hole 45 of the cover 40 and is locked. As illustrated in FIGS. 1 and 14, when front and rear surfaces of the packing 50 are normally assembled, the lock projection 52 enters the locking hole 45 of the cover 40 to be locked, so that the packing 50 is assembled and attached to the cover 40. As illustrated in FIG. 15, when the front and back surfaces of the packing 50 are misassembled, the lock projection 52 interferes with an upper end 28*a* of the abutment rib 28, so that it is detected that the packing 50 is misassembled.

In the terminal assembly structure 1 of the embodiment, when the crimp terminal 10 is assembled to the holder 20, the insulator 30 is inserted through the opening 21*a* of the peripheral wall 21 with cylindrical oval shape of the holder 20. The insulator 30 is positioned and fixed in the peripheral wall 21 by the positioning rib 26.

The DC terminal 15 is assembled in the peripheral wall 21 from the cylindrical part 23 on the lower side of the holder 20. The crimp terminal 10 is assembled in the peripheral wall 21 from the cylindrical part 22 on the upper side of the holder 20. At this time, as indicated by an arrow in FIG. 9, the fastening portion 12 of the crimp terminal 10 is incorporated into an interior of the peripheral wall 21 and moved. As illustrated in FIG. 10, the tip 12*a* of the fastening portion

12 is brought into contact with the inclined rib 36 of the insulator 30, and the fastening portion 12 is guided onto the terminal placing base 33.

Furthermore, the fastening portion 12 of the crimp terminal 10 is incorporated into the interior of the peripheral wall 21. As illustrated in FIGS. 11 and 12, the distal end 12*a* of the fastening portion 12 abuts against the abutment rib 28 positioned around the base 29 of the peripheral wall 21. At this time, the tip 12*a* of the fastening portion 12 abuts against the abutment rib 28 while both side portions 12*b* of the fastening portion 12 are positioned between the guide ribs 27 of the peripheral wall 21. Therefore, there is no concern that the tip 12*a* of the fastening portion 12 strongly comes into contact with the abutment rib 28. When the tip 12*a* of the fastening portion 12 abuts against the abutment rib 28, the position of the fastening portion 12 is corrected. Therefore, the screw hole 29*b* in the base 29 may be viewed from the oval hole 12*c* for fastening of the fastening portion 12. This configuration enables bolting of the crimp terminal 10 to the holder 20 without further adjustment of the position of the crimp terminal 10.

Thus, when the crimp terminal 10 is assembled into the peripheral wall 21 of the holder 20, the tip 12*a* of the fastening portion 12 abuts against the abutment rib 28 while the side parts 12*b* of the fastening portion 12 is positioned by the guide rib 27. Therefore, in the terminal assembly structure 1, fastening with the bolt is facilitated, and the assembling workability is improved. That is, the crimp terminal 10 can be simply and surely positioned in the peripheral wall 21 of the holder 20 and fastened with the bolt 14. Further, by providing the guide rib 27 and the abutment ribs 28 on the peripheral wall 21, a rigidity of the holder 20 may be improved.

Further, as illustrated in FIG. 13, in a state the holder 20 being in a state assembled with the insulator 30 and the DC terminal 15 and when the crimp terminal 10 is assembled to the holder 20 in a reversed orientation, the pair of crimping pieces 11*b* of the crimp terminal 10 come into contact with the pair of detection ribs 35 on the insulator 30. With this configuration, misassembly of the crimp terminal 10 may be detected.

As described above, the detection rib 35 of the insulator 30 eliminates the possibility of misassembly of the crimp terminal 10, and the inclined rib 36 of the insulator 30 smoothly guides the fastening portion 12 of the crimp terminal 10 to the upper surface 29*a* of the base, so that the assembling workability is improved. The insulator 30 is reduced in weight, leaving only the detection rib 35 and the inclined rib 36 which are necessary parts so as not to interfere with the function. Thus, the entire terminal assembly structure 1 may be reduced in weight.

Further, as illustrated in FIG. 14, when the opening 21*a* of the holder 20 is covered with the cover 40 to which the packing 50 is attached, the packing 50 is held on the upper surface of the upper end 28*a* of the abutment rib 28 of the holder 20 to ensure waterproofness. As illustrated in FIG. 15, when the packing 50 is assembled to the cover 40 in the reversed orientation, the lock projection 52 interferes with the upper end 28*a* of the abutment rib 28, and the misassembled state of the packing 50 is detected. Thus, the upper end 28*a* of the abutment rib 28 of the holder 20 can easily hold the packing 50 assembled to the cover 40 and detect misassembly.

Although the present embodiment has been described above, the present embodiment is not limited thereto, and various modifications are possible within the scope of the gist of the present embodiment.

That is, in the above embodiment, the oval hole formed in the fastening portion of the crimping terminal is a bolt insertion portion into which a bolt is inserted. However, the bolt insertion portion is not limited to the oval hole with the oval shape, but may be a hole having a circular shape or may be a C-shaped opening.

Further, according to the above embodiment, the base with cylindrical oval shape made of metal or hard resin and configured to fasten the crimping terminal is fitted and fixed in the cylindrical oval section of the holder. However, as the base, a metal base may be insert-molded into the holder, or a resin base may be integrally molded with the holder.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A terminal assembly structure comprising:

a crimp terminal having a crimp portion configured to crimp and connect a core wire of an electric wire and a fastening portion configured to be fastened by a fastening member; and a holder having a base portion configured to place the crimp terminal when fastening the crimp terminal to the holder, wherein the base portion has a terminal placing base configured to place the fastening portion of the crimp terminal on an upper stage of the base portion, the base portion has, on a front side of the terminal placing base, a pair of detection ribs arranged at a narrower interval than an overall width of the crimp portion, and the pair of detection ribs oppose and come in contact with the crimp portion in a longitudinal direction of the crimp terminal and interfere with the crimp portion in the longitudinal direction upon misassembly of front and back sides of the crimp terminal to the holder.

2. The terminal assembly structure according to claim 1, wherein the base portion has an inclined rib arranged between the pair of the detection ribs, and the inclined rib is configured to guide the fastening portion of the crimp terminal to the terminal placing base.

3. The terminal assembly structure according to claim 1, wherein the fastening portion of the crimp terminal is formed into a substantially rectangular plate shape with a tip shaped in an arcuate shape and has an oval hole for fastening formed in a center of the fastening portion and configured to insert a bolt as the fastening member through the oval hole for fastening.

4. The terminal assembly structure according to claim 1, wherein the pair of detection ribs protrude from the base portion and oppose the crimp portion of the crimp terminal in an assembled state.

5. The terminal assembly structure according to claim 4, wherein the pair of detection ribs interfere with the crimp portion only when misassembly of the front and back sides of the crimp terminal to the holder occurs.

6. The terminal assembly structure according to claim 1, wherein the misassembly refers to a state in which the crimp terminal is assembled in a reverse orientation in the holder.

7. The terminal assembly structure according to claim 6, wherein, the reversed orientation corresponds to a front side of the crimp portion facing a bottom wall of the base portion.

* * * * *